(12) United States Patent
Pettinotto et al.

(10) Patent No.: US 11,569,693 B2
(45) Date of Patent: Jan. 31, 2023

(54) DEVICES AND METHODS FOR PAIRING BETWEEN A WIRELESS CONTROL DEVICE AND AN ELECTRONIC UNIT

(71) Applicant: Schneider Electric Industries SAS, Rueil-Malmaison (FR)

(72) Inventors: Gilles Pettinotto, Vaulnaveys le Haut (FR); Alexis Pillet, Domene (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 499 days.

(21) Appl. No.: 16/708,661

(22) Filed: Dec. 10, 2019

(65) Prior Publication Data
US 2020/0204010 A1 Jun. 25, 2020

(30) Foreign Application Priority Data
Dec. 21, 2018 (FR) ...................................... 18 73989

(51) Int. Cl.
| | |
|---|---|
| *H04W 4/80* | (2018.01) |
| *H02J 50/80* | (2016.01) |
| *H02J 50/00* | (2016.01) |
| *G06F 21/44* | (2013.01) |
| *H04B 5/00* | (2006.01) |

(Continued)

(52) U.S. Cl.
CPC ............ *H02J 50/80* (2016.02); *G06F 21/445* (2013.01); *H02J 50/001* (2020.01); *H04B 5/0037* (2013.01); *H04L 9/3247* (2013.01); *H04W 4/80* (2018.02); *H04W 12/0433* (2021.01); *H04W 12/069* (2021.01); *H04W 12/108* (2021.01); *H04W 12/55* (2021.01); *H04W 24/02* (2013.01);

(Continued)

(58) Field of Classification Search
CPC ....................................................... H04L 12/50
USPC ............................................................ 370/329
See application file for complete search history.

(56) References Cited

U.S. PATENT DOCUMENTS

| | | |
|---|---|---|
| 2016/0321448 A1 | 11/2016 | Hsu et al. |
| 2017/0127221 A1 | 5/2017 | Erdmann et al. |

(Continued)

FOREIGN PATENT DOCUMENTS

| | | |
|---|---|---|
| CN | 205265270 U | 5/2016 |
| EP | 3 155 841 A1 | 4/2017 |

(Continued)

OTHER PUBLICATIONS

French Preliminary Search Report dated Jul. 15, 2019 in French Application 18 73989 filed on Dec. 21, 2018 (with English Translation of Categories of Cited Documents & Written Opinion), 12 pages.

(Continued)

*Primary Examiner* — Dang T Ton
(74) *Attorney, Agent, or Firm* — Oblon, McClelland, Maier & Neustadt, L.L.P.

(57) ABSTRACT

A method for operating a wireless control device includes the starting up of a control circuit following the actuation, by a user, of a control unit coupled to an energy harvesting device to recharge an energy reserve which electrically powers the control device; the sending of a control message including a control command; the comparison of the elapsed time since the starting up of the control circuit with a first threshold value; when the elapsed time is greater than or equal to the first threshold value, the sending of a pairing request message to the electronic unit.

15 Claims, 9 Drawing Sheets

(51) Int. Cl.
*H04L 9/32* (2006.01)
*H04W 24/02* (2009.01)
*H04W 56/00* (2009.01)
*H04W 74/08* (2009.01)
*H04W 12/55* (2021.01)
*H04W 12/069* (2021.01)
*H04W 12/108* (2021.01)
*H04W 12/0433* (2021.01)

(52) U.S. Cl.
CPC ... *H04W 56/0025* (2013.01); *H04W 74/0891* (2013.01)

(56) References Cited

U.S. PATENT DOCUMENTS

| | | |
|---|---|---|
| 2018/0115861 A1 | 4/2018 | Erdmann et al. |
| 2018/0227998 A1 | 8/2018 | Polychronakis |
| 2022/0054184 A9* | 2/2022 | Rajagopalan ...... A61B 18/1492 |

FOREIGN PATENT DOCUMENTS

| | | |
|---|---|---|
| EP | 3 358 910 A1 | 8/2018 |
| WO | WO 2015/189358 A1 | 12/2015 |
| WO | WO 2018/000570 A1 | 1/2018 |

OTHER PUBLICATIONS

Kheng, T., "Vibration Energy Harvesting System", Energy Harvesting Autonomous Sensor Systems: Design, Analysis and Practical Implementation, Jan. 2013, pp. 109-135.

* cited by examiner

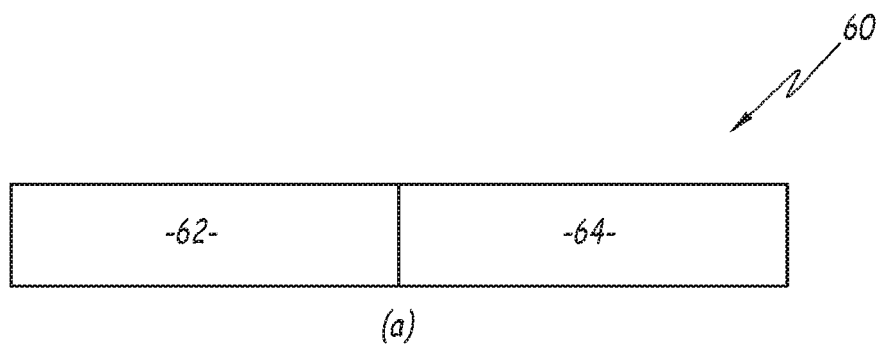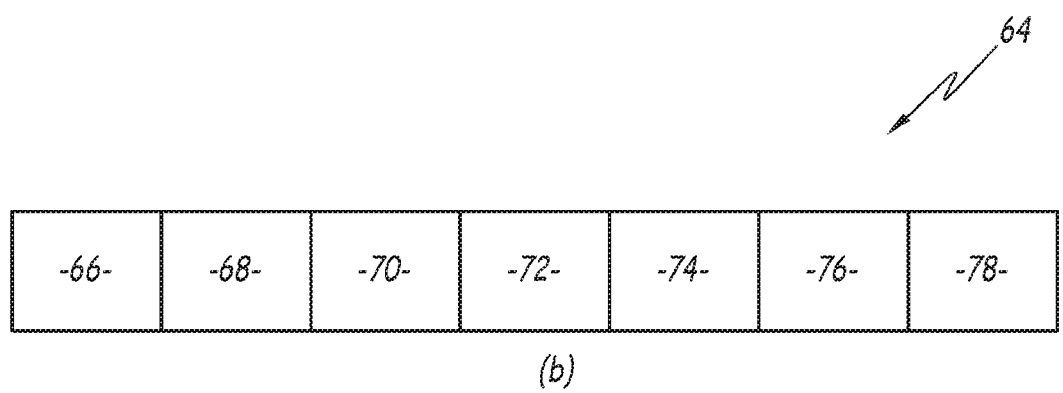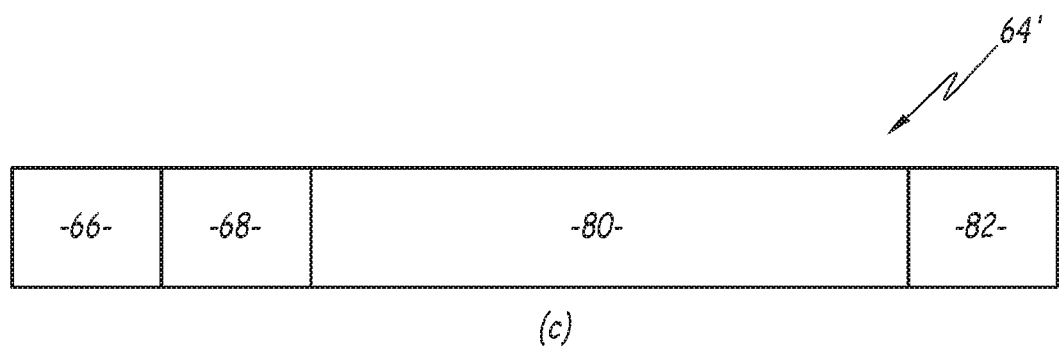
FIG.4

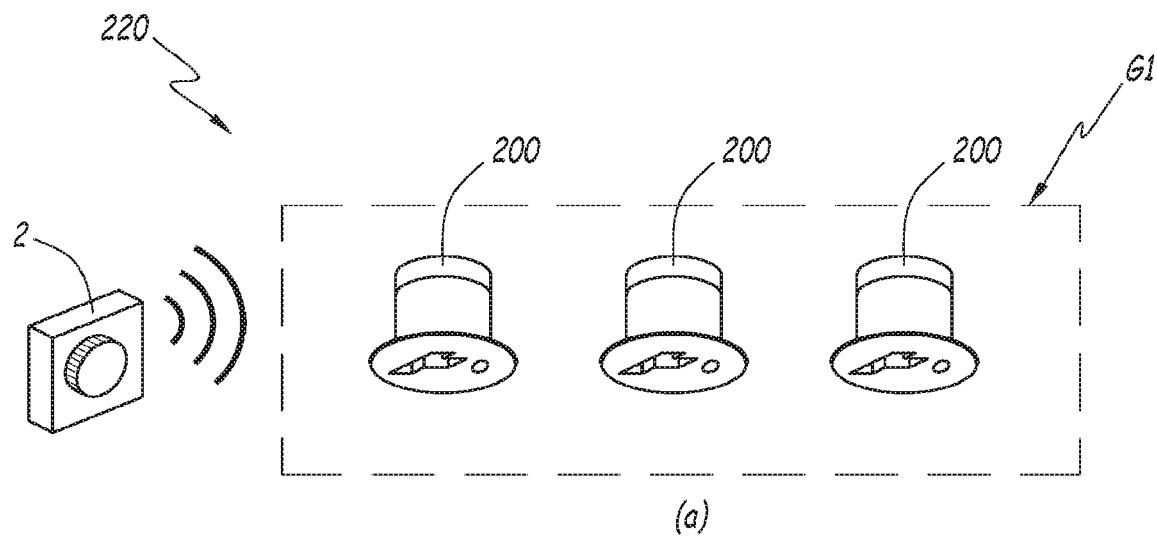
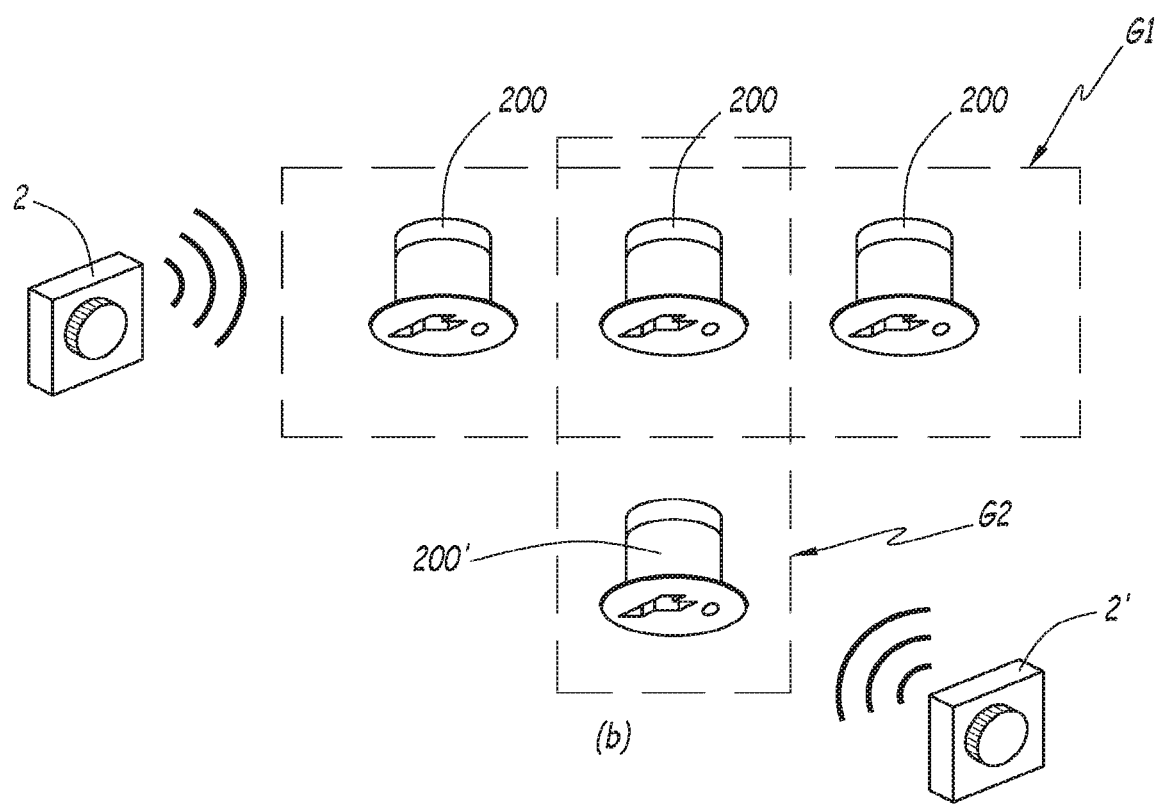
FIG.7

DEVICES AND METHODS FOR PAIRING BETWEEN A WIRELESS CONTROL DEVICE AND AN ELECTRONIC UNIT

The present invention relates to the devices and methods for pairing a wireless control device with an electronic unit.

In the area of home automation and of connected objects, there are wireless control devices, such as wireless switches, which make it possible to remotely control electronic units such as lamps or electrical equipment items or home automation appliances.

Typically, the connection between the control device and the unit to be controlled is set up created by a radio link, such as a short-range radio link.

For security reasons, it is desirable for this connection to be able to be encrypted and/or for the control device to be identified first by the unit to be controlled, in order to avoid the possibility of a hacker controlling the unit without having been so authorized.

A control device that has been newly added in a home automation installation must therefore be first paired with the unit or units to be controlled before being able to be used. In practice, a user must be able to request the pairing of the control device simply and easily.

Now, the wireless control devices have to be simple and inexpensive to manufacture and must consume only very little energy. In fact, they generally have a simplified design and have only very limited hardware resources available. Incorporating a user interface therein, such as an additional button, serving only for the pairing, is therefore complicated and unnecessarily costly.

There is therefore a need for a wireless control device and an associated method that make it possible to control the pairing of the control device that is capable of remedying the drawbacks described above.

To this end, one aspect of the invention relates to a method for operating a wireless control device, this method comprising:
  the starting up of a control circuit of the control device following the actuation, by a user, of a control unit coupled to an energy harvesting device to recharge an energy reserve which electrically powers the control device;
  the sending of a control message to an electronic unit, by means of a radio interface of the control device, the control message including a control command;
  the comparison of the elapsed time since the starting up of the control circuit with a first threshold value, the energy harvesting device being configured to generate, upon each actuation of the control unit, a quantity of energy that is sufficient to power the control device for a time less than the first threshold value;
  when the elapsed time is greater than or equal to the first threshold value, the sending of a pairing request message to the electronic unit, by means of the radio interface.

By virtue of the invention, a pairing request can be sent by a user simply by means of the control unit, by pressing several times on the control unit instead of pressing just once, which makes it possible to generate more energy, and therefore to allow the control circuit to operate for long enough to reach the first threshold value and thus be able to send the pairing request messages.

The control unit is therefore used both to control an electronic unit and to request the pairing of the control device. It is not therefore necessary to add a dedicated control interface for this single function, which would have increased the complexity and the cost of the control device.

According to advantageous but non-mandatory aspects, such a method can incorporate one or more of the following features, taken alone or according to any technically admissible combination:
  The sending of the control message is repeated as long as the elapsed time is less than the first threshold value.
  The sending of the pairing request message is repeated as long as the elapsed time is greater than the first threshold value and less than a second threshold value.
  The method comprises the resumption of the sending of control messages when the elapsed time is greater than the second threshold value and as long as there remains sufficient energy in the energy reserve.
  The second threshold value is between 800 ms and 1000 ms.
  The first threshold value is between 400 ms and 600 ms.
  The pairing request message includes authentication information specific to the control device, notably a public cryptographic key associated with the control device.
  The control message comprises a header and a body comprising:
    a unique identifier of the control device;
    the control command;
    security data generated by the control device and aiming to avoid replay attacks;
    a digital signature of the message, generated by the control device.
  The pairing request message comprises a header and a body comprising:
    a unique identifier of the control device;
    authentication information specific to the control device;
    a digital signature of the message, generated by the control device.
  The method comprises the stopping of the control circuit when the energy reserve is empty.
  According to another aspect, the method comprises:
  the reception, by a plurality of electronic units belonging to one and the same group of units, of the control message sent by the control device;
  the sending, by each electronic unit, of a synchronization message to the other electronic units of the group, the synchronization message comprising information representative of a state of the electronic unit and of a control command contained in said control message;
  detecting that at least one of the electronic units of the group has a state different from the state of at least one or more of the other electronic units of the group;
  modifying the state of said electronic unit according to the state of a main unit of the group.

According to another aspect, the main unit is the electronic unit of the group for which the quality of the radio communication link with the control device is the highest out of the electronic units of the group.

According to yet another aspect, the invention relates to a pairing method between a wireless control device and an electronic unit, this method comprising:
  the activation of a pairing mode of the electronic unit;
  the implementation, by the wireless control device, of a method as described above;
  by the electronic unit:
    detecting the reception of a pairing request message sent by said control device;

determining whether said control device is already paired with the electronic unit;

accepting the pairing of the control device if the latter was not already paired with the electronic unit or, otherwise, cancelling the pairing of the control device.

According to another aspect, the invention relates to a wireless control device, comprising:

a control unit that can be actuated by a user;

an energy harvesting device coupled to the control unit;

an energy reserve recharged by the energy harvesting device and which electrically powers the control device;

a control circuit and a radio interface;

the control circuit being programmed to:

start up, following the actuation, by a user, of the control unit;

send a control message to an electronic unit, by means of the radio interface, the control message including a control command;

compare the elapsed time since the starting up of the control circuit with a first threshold value, the energy harvesting device being configured to generate, upon each actuation of the control unit, a quantity of energy that is sufficient to power the control device for a time less than the first threshold value;

when the elapsed time is greater than or equal to the first threshold value, send a pairing request message to the electronic unit, by means of the radio interface.

According to yet another aspect, the invention relates to a home automation system comprising a control device as defined previously and a plurality of electronic units, in which the electronic units are configured to implement steps comprising:

the reception, by a plurality of electronic units belonging to one and the same group of units, of the control message sent by the control device;

the sending, by each electronic unit, of a synchronization message to the other electronic units of the group, the synchronization message comprising information representative of a state of the electronic unit and of a control command contained in said control message;

detecting that at least one of the electronic units of the group has a state different from the state of at least one or more of the other electronic units of the group;

modifying the state of said electronic unit according to the state of a main unit of the group.

The invention will be better understood and other advantages thereof will become more clearly apparent in light of the following description of an embodiment of devices and methods for pairing a wireless control device, given purely by way of example and with reference to the attached drawings, in which:

FIG. 4 is a schematic illustration of examples of messages sent by the control device of FIG. 1;

FIG. 7 is a schematic illustration of two examples of groups of electronic units according to embodiments of the invention;

Figure 1:
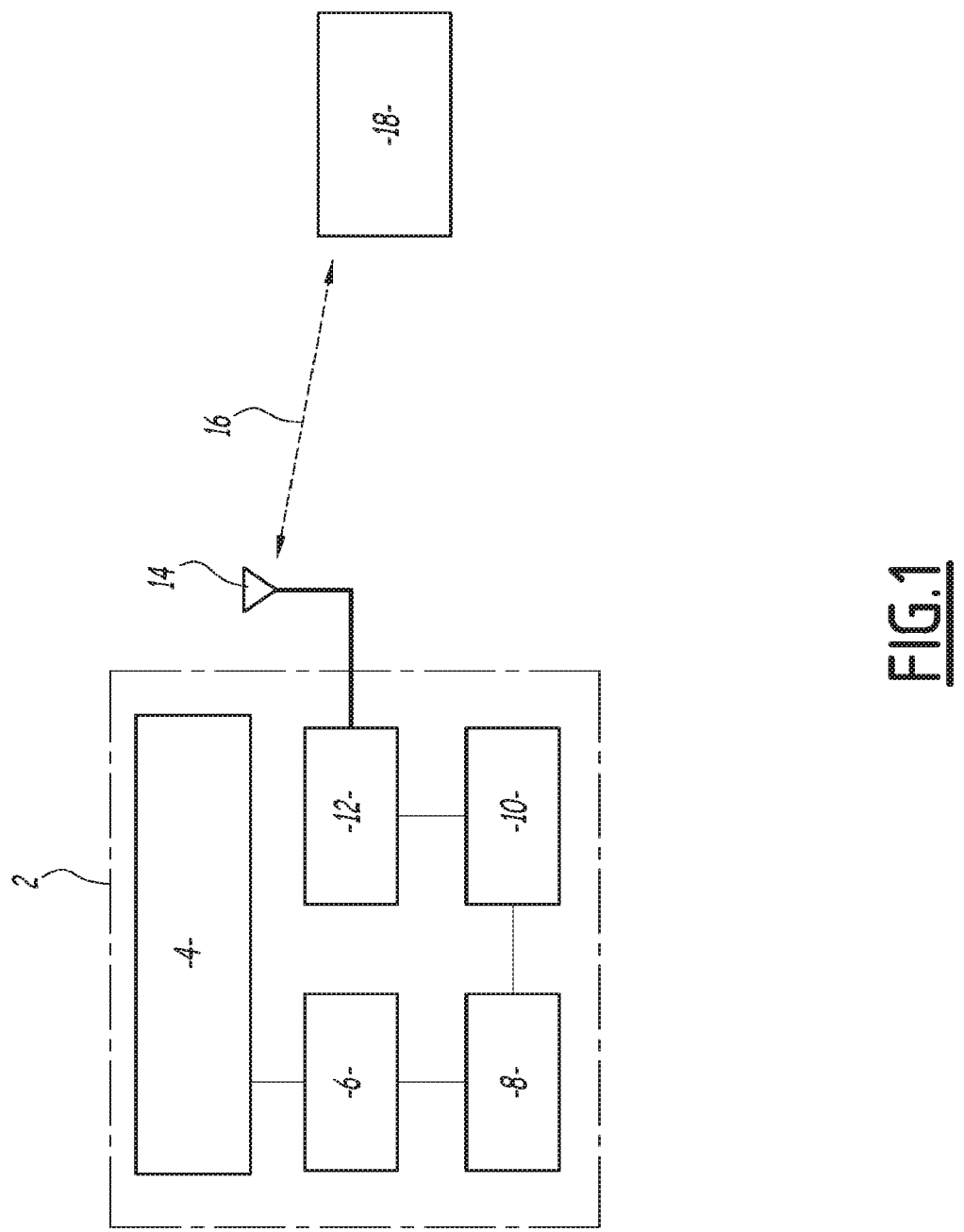
FIG. 1 is a schematic illustration of an electronic unit and of a wireless control device according to embodiments of the invention for controlling the electronic unit.

Referring to FIG. 1, a wireless control device 2 is represented.

For example, the control device 2 is a remote control or a wireless wall switch.

According to examples, the control device 2 can be used in a home automation installation to control one or more electronic units, particularly in a building for residential, industrial or commercial use.

The control device 2 comprises a control unit 4, an energy harvesting device 6 coupled to the control unit 4, an energy reserve 8 powered by the device 6, an electronic control circuit 10, a radio communication interface 12 and a radio antenna 14.

The interface 12 and the antenna 14 make it possible to create a radio communication link 16 to communicate with an electronic unit 18.

Thus, the control device 2 does not need to be connected to the unit 18 by a wire.

According to examples given purely illustratively, the electronic unit can be a lighting system, including one or more lamps, or an electrical equipment item such as an electrical outlet, or a home automation equipment item such as a heating or air-conditioning system, electric shutters, a home automation controller or yet other examples.

The control unit 4 can be actuated by a user to send a control command to the unit 18, for example to switch on or switch off the unit 18.

According to embodiments, the control unit 4 is a mechanical or electromechanical device that can be switched between a first position and a second position and can, to this end, comprise a mobile part on which a user can press, such as a switch or a pushbutton.

For example, the control unit 4 is a toggle switch that can be switched between two stable positions.

According to other examples, the control unit 4 is a switch of pushbutton type that can be switched between two stable positions or, as a variant, between a stable position and an unstable position.

According to yet other variants, the control unit 4 is a contactless touch switch.

The device 6 is configured to generate a predefined quantity of electrical energy when the control unit 4 is actuated by the user and to store the duly generated quantity of energy in the energy reserve 8.

Thus, the device 6 is coupled with the control unit 4 and connected with the energy reserve 8.

According to examples, the device 6 comprises an electromagnetic generator, such as a dynamo or a system including a magnet and a solenoid that can be displaced relative to one another to generate an electrical current when the control unit 4 is actuated by the user.

As a variant, the device 6 can comprise a piezoelectric generator connected mechanically with a mobile part of the control unit 4.

The energy reserve 8 comprises one or more rechargeable electricity storage elements, such as a capacitor, or a supercapacitor, or an electrochemical cell, or any equivalent element.

In practice, according to embodiments, the control device 2 has no electrical power supply other than the reserve 8.

The electronic control circuit 10 comprises a computation logic unit such as a microcontroller, and a computer memory.

The memory forms a permanent data storage medium that can be read by computer.

According to examples, the memory is a ROM memory, or a RAM memory, or a non-volatile memory of EPROM, or EEPROM, or FLASH, or NVRAM type, or an optical memory or a magnetic memory.

The memory comprises executable instructions and/or software code for implementing a method as described hereinbelow to operate the control device 2 when these instructions and/or this code are executed by the computation logic unit.

The control circuit 10 is also capable of measuring the elapsed time, for example using a dedicated clock or using a clock incorporated in the microcontroller.

As a variant, the control circuit 10 comprises a dedicated electronic circuit, for example of ASIC (Application-Specific Integrated Circuit) type, or a programmable logic component, for example of FPGA (Field-Programmable Gate Array) type.

According to modalities of implementation, the control circuit 10 is electrically powered only using the energy reserve 8 and ceases to operate when the energy reserve 8 is empty or insufficiently charged.

The radio interface 12 is connected to the control circuit 10 and makes it possible, using the antenna 14, to establish the communication link 16.

For example, the radio interface 12 comprises a transceiver circuit connected to the control circuit 10 and to the antenna 14.

According to examples, the radio interface 12 is configured to establish a short-range radio link, notably according to a radio communication protocol of Bluetooth (registered trade mark) type, of Zigbee (registered trade mark) type or of Z-Wave (registered trade mark) type, or according to other radio communication protocols.

As a variant, the radio interface 12 can establish a long-range radio link, for example according to a radio communication protocol of LoRa (registered trade mark) type.

In practice, the radio interface 12 is electrically powered solely using the energy reserve 8 and ceases to operate when the energy reserve 8 is empty or insufficiently charged.

Preferably, the energy harvesting device 6 is configured to generate, upon each actuation of the control unit 4, that is to say, here, upon each time a user presses on the mobile part of the control unit 4, a quantity of energy that is sufficient to power the control device 2 for a certain predefined time, notably when this control device 2 sends messages to the unit 8.

Subsequently, a first time threshold value, denoted T1 (FIG. 3) is defined.

The first threshold value T1 is chosen such that said predefined time is less than the first threshold value T1, for example less than or equal to 60%, or 80%, or 90%, or 95% of the first threshold value T1.

According to examples, the first threshold value T1 is greater than or equal to 400 milliseconds (ms) and less than or equal to 600 ms and, preferably, greater than or equal to 450 ms and less than or equal to 550 ms.

In the example illustrated, the first threshold value T1 is equal to 500 ms.

It is therefore understood that a single actuation of the control unit 4 generates a quantity of energy that is sufficient to charge the reserve 8 so as to ensure the power supply of the control device 2 for a time that cannot exceed the first threshold value T1, and that an additional actuation of the control unit 4 generates an additional quantity of energy which allows the control device 2 to operate for longer, for a second predefined time, ranging beyond the first threshold value T1.

For example, the additional actuation can be performed immediately after the initial actuation of the control unit 4. Such is notably the case when the user presses twice in succession on the control unit 4.

Subsequently, a second time threshold value, denoted T2, is defined.

According to examples, the second threshold value T2 is greater than or equal to 800 ms and less than or equal to 1000 ms and, preferably, greater than or equal to 850 ms and less than or equal to 950 ms.

In the example illustrated, the second threshold value T2 is equal to 850 ms.

In practice, the first threshold value T1 and the second threshold value T2 are chosen notably according to properties of the harvesting device 6 and/or properties of the energy reserve 8 and/or consumption properties of the control circuit 10 and of the radio interface 12.

Generally, the communication between the control device 2 and the unit 18 comprises the sending of messages over the communication link 16.

For example, each message sent by the control device 2 comprises a frame including data intended for the unit 18.

Preferably, the sending of messages over the link 16 is secured using a signature incorporated in each message, or even, as a variant, by encrypting the content of the messages or the communication link 16.

According to embodiments, the control circuit 10 is programmed to sign each of the messages sent by the control device 2 by means of a digital signature generated from a private cryptographic key stored in memory.

The unit 18 is, for its part, programmed to, when it receives a message originating from a control device, reject or disregard a message which has no signature and/or signed with an unknown signature, and to accept only the messages signed with a valid and known signature.

It is understood that the control device 2 must first be the subject of a pairing with the unit 18 in order to be able to control the latter.

In embodiments, the pairing comprises the prior identification of the control device 2 with the unit 18 by sending to it authentication information which are specific to the control device.

For example, the authentication information comprises a public cryptographic key associated with a private cryptographic key of the control device 2.

According to variants that are optional and not described in detail, the private cryptographic key can also be used by the control device 2 to encrypt the messages.

In practice, the control device 2 is capable of sending two different types of messages to the unit 18: control messages and pairing request messages.

As an example, a control message makes it possible to control the unit 18.

For example, the control message contains a control command describing an action that the unit 18 must carry out (for example switch on or switch off a lamp), the nature of this action being able to depend on the state of the control unit 4.

The pairing request message contains, among other things, the authentication information previously mentioned.

FIG. 4 illustrates examples of messages or radio frames that can be sent by the control device 2.

The zone (a) of FIG. 4 represents an example of message 60 comprising a header 62 and a body 64 containing the data to be transmitted.

In practice, the form and the content of the header 62 depend on the nature of the communication protocol used for the communication link 16. The header 62 is not described in more detail here.

The zone (b) of FIG. 4 represents the body 64 of an example of a control message.

In the example illustrated, the body 64 comprises:
- a field 66 containing data identifying the nature of the message, for example to specify that the message is a control message;
- a field 68 including a unique identifier of the control device 2, such as a value of UUID type;
- a field 70 comprising routing information, notably when the command is intended for a unit other than the unit 18 which receives the message but which is connected to the latter by another communication link;
- a field 72 comprising a control command to control the electronic unit, this command being for example expressed in the form of a predefined function code;
- a field 74 comprising a version number of the control circuit 10;
- a field 76 comprising security data, such as a random number generated by the control device 2, aiming to avoid replay attacks;
- a field 78 comprising a digital signature of the message, generated by the control device 2.

This example is given purely illustratively and, according to other embodiments, the body 64 can be formed otherwise and contain different information, some fields and/or some information being able to be omitted or presented differently.

The zone (c) of FIG. 4 represents a body 64' of an example of a pairing request message, this body 64' replacing the body 64 previously described.

In the example illustrated, the body 64' comprises:
- a field 66 containing data identifying the nature of the message, for example, here, to specify that the message is a pairing request message;
- a field 68 including a unique identifier of the control device 2, as previously described;
- a field 80 comprising authentication information as previously described, comprising, for example, the public cryptographic key;
- a field 82 comprising a digital signature of the message, generated by the control device 2, as previously described.

This example is given purely illustratively and, according to other embodiments, the body 64' can be formed otherwise and contain different information, some fields and/or some information being able to be omitted or presented differently.

Figure 2:
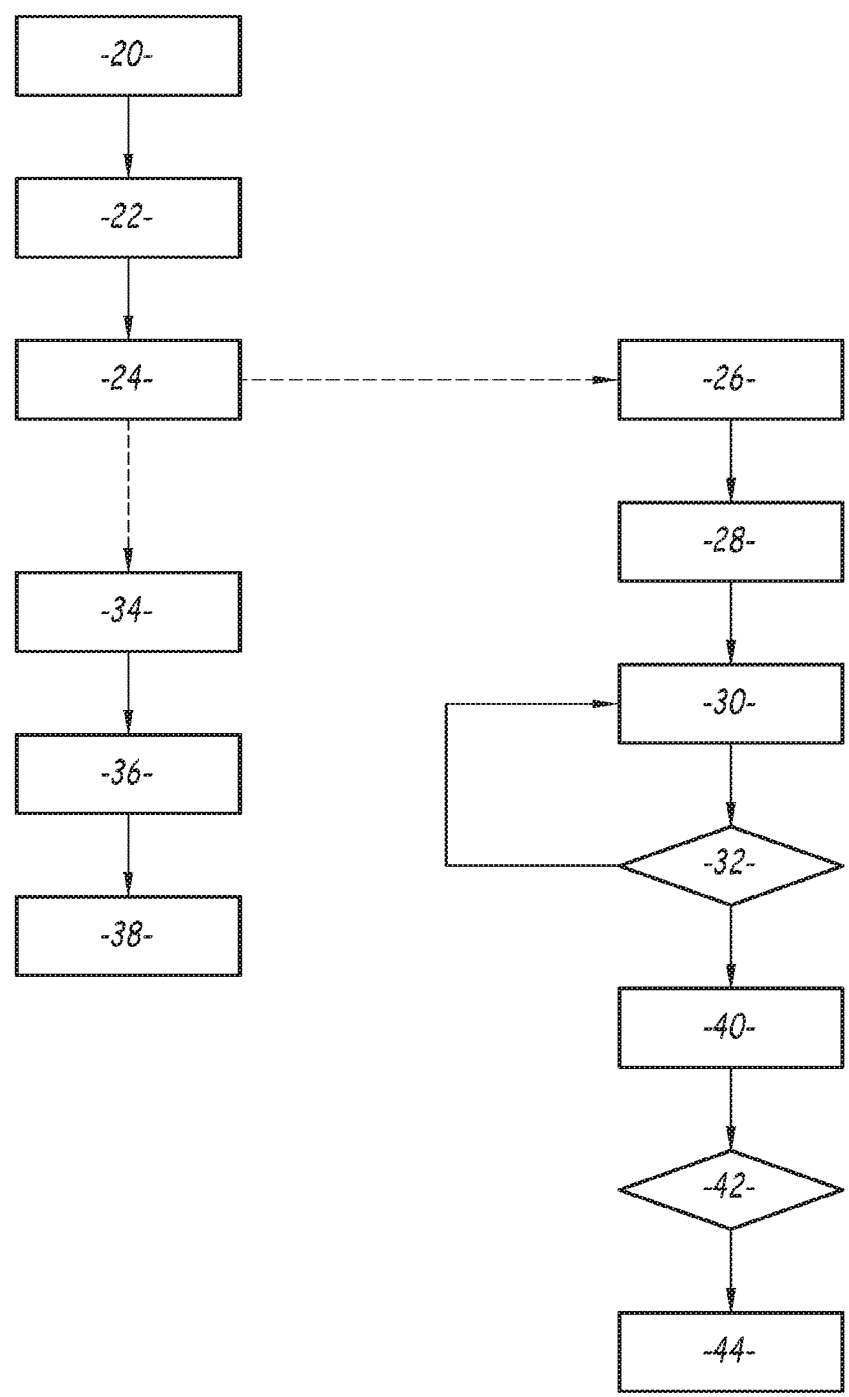
FIG. 2 is a flow diagram of an example of a method for operating the control device of FIG. 1.
Figure 3:
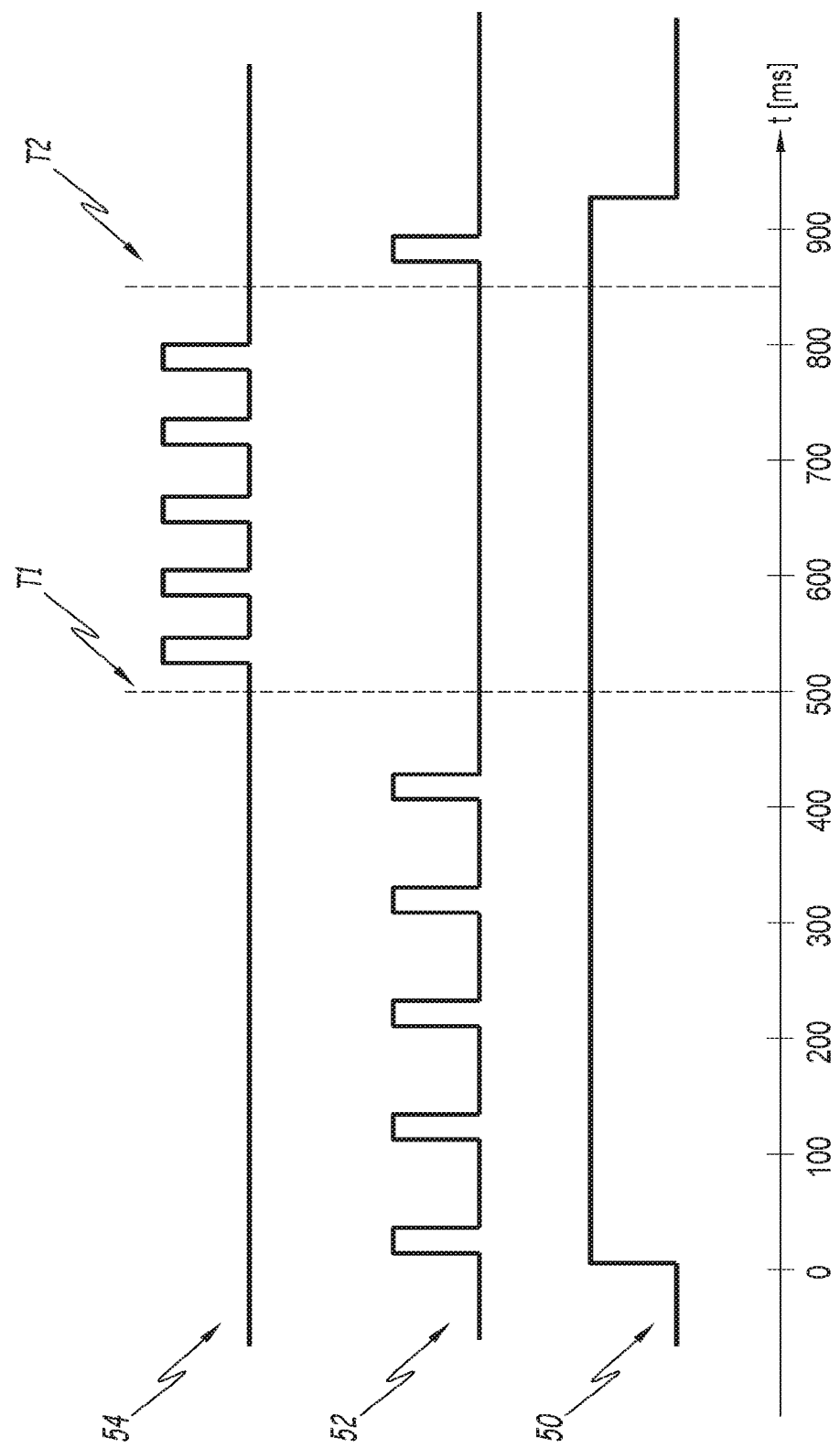
FIG. 3 is a timing diagram illustrating the sending of radio messages in an example of operation of the control device of FIG. 1 during the implementation of the method of FIG. 2.

An example of operation of the control device 2 is now described with references to FIGS. 2 and 3.

Initially, the control circuit 10 is in an off or inactive state and the energy reserve 8 is empty or discharged.

In a step 20, a user actuates the control unit 4.

In response, the device 6 generates a predefined quantity of electrical energy (step 22) which is used to charge the energy reserve 8 (step 24).

Next, in a step 26, the control circuit 10 immediately starts up, provided that the energy reserve 8 is sufficiently charged.

For example, the control circuit 10 is programmed to start up (or be "woken up") and remain in operation as soon as the energy reserve 8 reaches a certain level of charge.

In a step 28, the control circuit 10 initializes a time counter to count the elapsed time since the starting up of the control circuit 10.

In a step 30, the control circuit 10 generates and sends, by means of the radio interface 12, a control message to the unit 18.

Then, in a step 32, the control circuit 10 compares the elapsed time since the starting up of the control circuit 10, as indicated by the counter, with the first threshold value T1.

For example, the first threshold value T1 is prestored in memory of the control circuit 10.

According to embodiments, as long as the elapsed time is less than the first threshold value T1, the sending of the control messages is repeated, for example by reiterating the steps 30 and 32.

For example, the control messages are sent with a predefined periodicity.

If the energy reserve 8 has not been recharged in the meantime, the control circuit 10 ceases to operate. The sending of the control messages is then stopped. The method terminates.

It goes differently if the energy reserve 8 has been recharged in the meantime.

For example, in parallel, in a step 34, the control unit 4 is once again actuated by a user.

In response, the device 6 generates a predefined quantity of electrical energy (step 36) which is added to the energy already contained in the energy reserve 8 (step 38).

In practice, the steps 20 and 34 can be implemented in rapid succession when the control unit 4 is doubly actuated, for example when the user presses twice in succession on the control unit 4.

In the step 32, if the control circuit 10 determines that the elapsed time is greater than or equal to the first threshold value T1, then, during a step 40, the control circuit 10 generates and sends, by means of the radio interface 12, a pairing request message to the unit 18.

Then, in a step 42, the control circuit 10 compares the elapsed time since the starting up of the control circuit, as indicated by the counter, with the second threshold value T2.

For example, the second threshold value T2 is prestored in memory of the control circuit 10.

According to embodiments, as long as the elapsed time is less than the second threshold value T2, while being greater than the first threshold value T1, the sending of the pairing request messages is repeated, for example by reiterating the steps 40 and 42.

For example, the pairing request messages are sent with a predefined periodicity, which is not necessarily the same as the sending period of the control messages.

If the energy reserve 8 is discharged before reaching the second threshold value T2, the control circuit 10 ceases to operate and the sending of the pairing request messages is stopped. The method terminates.

Advantageously, the second threshold value T2 is chosen so as to leave sufficient time for the control circuit 10 and the radio interface 12 to send at least one pairing request message to the unit 18 before the energy reserve 8 is discharged.

According to embodiments, if the energy reserve 8 is still sufficiently charged when the control circuit 10 determines, in the step 42, that the elapsed time is greater than or equal to the second threshold value T2, then the method comprises, in a step 34, the resumption of the sending of a control message to the unit 18.

For example, at this stage, pairing request messages are no longer sent.

Advantageously, the step 44 is then repeated until the energy reserve 8 is discharged. The sending of the control messages is then stopped and the method terminates.

In FIG. 3, the line 50 schematically represents the on or off state of the control circuit 10 (illustrated by a high or low level, respectively) as a function of time.

The time "t" is, here, indicated in milliseconds on the x-axis and counted from the instant when the control unit 4 is actuated.

The line 52 represents the instants at which the control messages are sent, each pulse corresponding to the sending of a control message.

Similarly, the line 54 represents the instants at which the pairing request messages are sent, each pulse corresponding to the sending of a pairing request message.

In the example illustrated, the control circuit 10 starts up immediately after the actuation of the control unit 4, for example after a few milliseconds.

Several control messages are then sent before reaching the first threshold value T1. In the example illustrated, five control messages are thus sent but, as a variant, this number can be different, for example greater than or equal to 1.

Subsequently, several pairing request messages are then sent before reaching the second threshold value T2. In the example illustrated, five pairing request messages are thus sent, but, as a variant, this number can be different, for example greater than or equal to 1.

Finally, a single additional control message is sent after having exceeded the second threshold value T2, before the control circuit 10 is switched off for want of having enough energy in the reserve 8 to continue to operate.

It is understood that this example is given illustratively and that, according to other embodiments, the number of messages sent, the sending periodicity and the total time of operation could be defined differently.

With the invention, a pairing request can be sent by a user simply by means of the control unit 4, by pressing several times on the control unit 4, for example by pressing twice in succession, instead of pressing once to normally control the unit 18.

This action on the control unit 4 makes it possible to generate more energy, and therefore to allow the control circuit 10 to operate for a sufficiently long time to reach the first threshold value T1 and thus be then able to send one or more pairing request messages.

The control unit 4 is therefore used both to control an electronic unit and to request the pairing of the control device 2. It is not therefore necessary to add a dedicated control interface for this sole function, which would have increased the complexity and the cost of the control device 2.

That thus makes it possible to incorporate a pairing request function in a wireless control device which is simple and inexpensive to manufacture and which consumes only very little energy.

Figure 5:
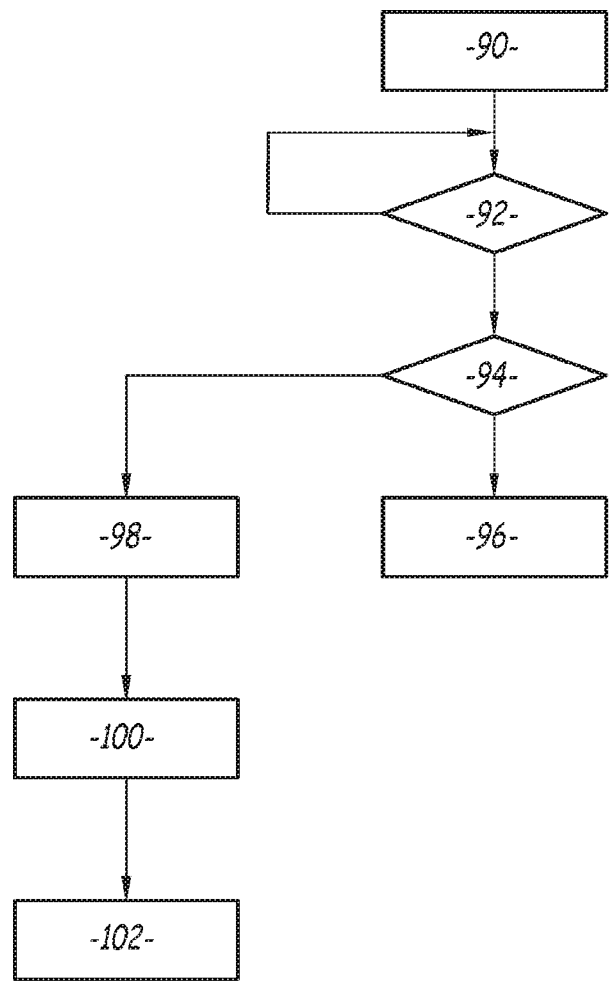
FIG. 5 is a flow diagram of a method for pairing the electronic unit and the wireless control device of FIG. 1.

An example of a pairing method between the control device 2 and the unit 8 is now described with reference to FIG. 5.

This method is for example implemented by an electronic control circuit and a radio interface that are specific to the unit 18 which are not described in detail here.

In a step 90, the unit 18 is placed in a pairing mode, for example following an action of a user.

For example, the unit 18 can be switched between a normal operating mode, in which the messages received are intended to control the unit and a pairing mode, in which the messages received are intended to transmit identification information from a control device.

In parallel, the control device 2 can implement a method as described in FIG. 2, in order to generate pairing request messages.

In a step 92, the unit 18 detects whether a pairing request message has been received.

For example, the step 92 is repeated as long as no pairing request message is received and as long as the unit 18 is in the pairing mode.

If the pairing request message is received, then, in a step 94, the unit 18 determines whether said control device 2 is already paired with the electronic unit, for example by automatically checking a pairing list, or a table, or any other data structure, indicating the pairing state of the unit 18 with the external peripheral devices.

For example, the control device 2 is identified by means of its unique identifier stored in the field 68 of the pairing request message.

If the control device 2 is identified as not being already paired with the unit 18, then the pairing of the control device 2 is accepted in a step 96.

For example, said pairing list is updated by adding the identifier of the control device 2.

Otherwise, that is to say if the control device 2 is identified as being already paired with the unit 18, then the existing pairing of the control device 2 is cancelled in a step 98.

For example, said pairing list is updated by deleting the identifier of the control device 2.

Optionally, in steps 100 and 102, the control device 2 can be automatically removed from additional tracking lists defining groups or families of external peripheral devices paired with the unit 18.

Thus, the pairing command defined by double activation of the control unit 4 can also be used to request the unpairing of the control device 2.

In practice, it is sufficient for a pairing request message to be received by the unit 18. According to examples, a timer can be installed to temporarily disable the method and thus avoid having pairing request messages sent in rapid succession by one and the same control device 2 lead to a succession of pairings and unpairings.

Embodiments relating to the unit 18 are now described.

Figure 6:
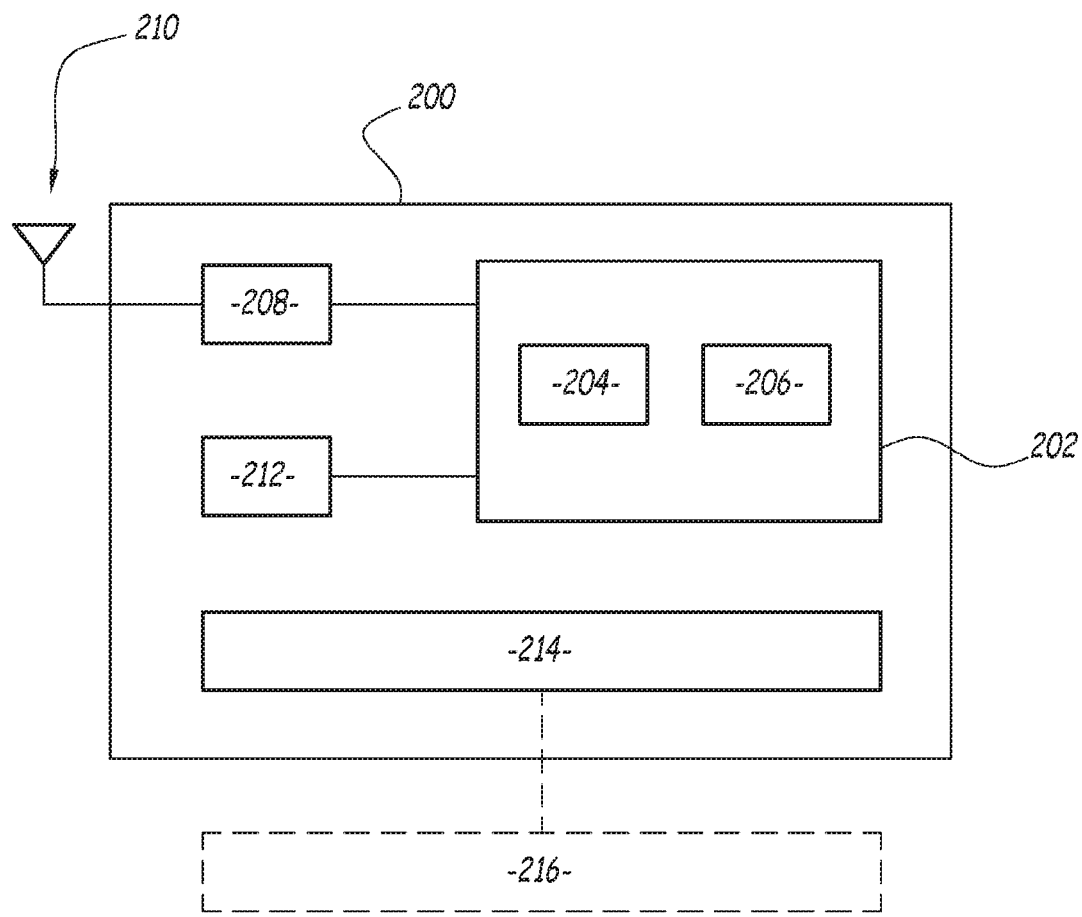
FIG. 6 is a schematic illustration of an electronic unit according to embodiments of the invention.

FIG. 6 illustrates an example of an electronic unit 200 similar to the generic unit 18 previously described.

In the example illustrated, the unit 200 is an electrical distribution point, for example a switch, or an electrical outlet, and more particularly an outlet configured to receive one or more light elements, such as a light-emitting module including one or more light-emitting diodes (LED), or an incandescent lamp, or a halogen lamp, or any other equivalent light element.

Generally, the unit 200 can be an electrically-controlled actuator or an outlet capable of receiving an electrically-controlled actuator. "Actuator" denotes an electrical system which can be switched between at least two states, for example an on state and an off state.

According to an example given illustratively, the unit 200 is a light connection device (DCL) compatible with the IEC-61995 standard. The unit 200 can be intended to be incorporated in a ceiling or in a wall of a building, although this example is not limiting and other uses are possible.

The invention is notably not limited to lighting systems.

In alternative embodiments, the unit 200 can be an electrical equipment item such as an electrical outlet, or a home automation equipment item such as a heating or air conditioning system, electric shutters, a home automation controller, or an actuator, or any other similar unit.

According to embodiments given by way of example, the unit 200 forms part of a home automation system. For example, this home automation system includes one or more control devices 2 configured to control the unit 200.

According to exemplary embodiments, the unit 200 comprises:
- an electronic control circuit 202 including a computation logic unit, such as a processor 204, and a memory 206;
- a radio interface 208, such as a radio transceiver circuit, comprising a radio antenna 210;
- a user interface 212, such as a button or a switch, for requesting a pairing of the unit 200, and
- an actuation circuit 214 configured to be connected to an electrical load 216, in order to electrically power said electrical load.

For example, the electrical load 216 is a light element as described previously.

According to examples, the memory 206 is a ROM memory, or a RAM memory, or a non-volatile memory of EPROM, or EEPROM, or FLASH, or NVRAM type, or an optical memory or a magnetic memory.

The memory 206 comprises executable instructions and/or a software code for implementing a method as described hereinbelow to operate the control device 2 when these instructions and/or this code are executed by the processor 204.

The memory 206 can also contain an identifier used to identify the unit 200, such as an identifier of UUID type or a physical address such as an MAC (Media Access Control) address associated with the radio communication interface 208, or any appropriate identifier.

As a variant, electronic control circuit 202 comprises a dedicated electronic circuit, for example an electronic circuit of ASIC (Application-Specific Integrated Circuit) type or a programmable logic component, for example of FPGA (Field-Programmable Gate Array) type.

The radio interface 208 is configured to establish a link with the radio interface 12 of the control device 2. Preferably, the radio interface 208 is also configured to establish a link with other units 200.

Preferably, the radio interface 208 uses a short-range radio communication protocol of Bluetooth (registered trade mark) type, or of Zigbee (registered trade mark) type or of Z-Wave (registered trade mark) type, but other radio communication protocols are possible as variants.

Each unit 200 can be switched between an active state and an inactive state, according to control commands sent by one or by several control devices 2 with which said unit 200 has been previously paired.

For example, when the unit 200 is in the active state, the light element 216 emits light, whereas in the inactive state, the light element 216 is off.

The control commands can also be sent by a mobile communication terminal, such as a mobile telephone, with which the unit 200 has been previously paired. Thus, in the following, the examples in which the units 200 are controlled by a control device 2 can be transposed to the case where the units 200 are controlled by a mobile telephone.

According to embodiments, several units 200 can be associated with one or more control devices 2 within one and the same group.

For example, when several units 200 belong to one and the same group, they are intended to simultaneously change state according to the control commands received.

For example, each group is defined in software terms.

Thus, the units 200 do not need to be linked by cable to the control device 2. That simplifies the creation of the groups, as well as the deletion and the modification thereof. In practice, each unit 200 can nevertheless be connected to an electrical power supply cable which supplies the electrical power necessary to operate the element 216.

Whether or not a unit 200 belongs to one of the groups is for example managed at least partly using the control circuit 202 of that unit 200.

According to advantageous embodiments, the units 200 belonging to one and the same group are configured to be in communication with one another, for example by exchanging synchronization messages repeatedly over time.

For example, as will be described hereinbelow in an example with reference to FIG. 9, the synchronization messages sent by a unit 200 can include information representative of the state of the unit and of the last control command received.

That makes it possible to avoid a loss of synchronization between several units 200, and notably avoid having one of the units 200 be in a state different from the state of the other units 200 of the group.

Indeed, if one of the units does not receive a control command asking it to change state when the other units of the group have received it, this unit will then be in a different state (for example, a lamp which remains on while the other lamps are off) and all the control commands sent thereafter requesting a change of state will lead this unit to remain in a state different from that of the other units.

According to embodiments given by way of example, each group is defined in software terms by means of a digital identifier shared between the units belonging to one and the same group. For example, each unit 200 contains in memory 206 a data structure listing the identifiers of the groups to which it belongs.

According to examples, the digital identifier of the group (group UID name) can be a unique identifier formed from the digital identifier of one of the units of the group, preferably the identifier having the lowest digital value out of the respective identifiers of said units. To this identifier can be added a serial number and a digital value representative of the number of units belonging to the group.

The digital identifier of the group can be formed by concatenation of these elements, or by other combination operations according to a predetermined digital function.

According to exemplary embodiments, each group can comprise a unit 200 having a primary unit status (also called "master"), the other units 200 of the group having a secondary unit status (also called "slave").

For example, the primary unit status or the secondary unit status of each of the units 200 is defined according to the quality of the radio link between that unit and the control device 2 sending the control commands.

For example, the quality of the radio link is calculated for each unit from one or more measurements of characteristics of the radio signal and is expressed in the form of a digital value, such an RSSI ("Received Signal Strength Indication") coefficient.

That makes it possible to ensure that the unit acting as main unit is able to receive the control commands sent by the control device 2 and thus avoid having control commands not be received.

In practice, in the synchronization between units of the group, the main unit can impose its state on all or some of the secondary units, which thus limits the risk of a control command not being received by units 200 of the group which might be further away from the control device 2.

It is understood that the status of each unit can change over time in its operation, notably if the quality of the radio link came to be altered, or if a different control device came to be used.

For example, the unit 200 having the best RSSI is selected as being the main unit. In practice, it is often the unit 200 situated closest to the control device 2.

In other words, the main unit is the unit of the group for which the quality of the radio communication link with the control device 2 is the highest out of the units 200 of the group.

The selection of the main unit can be updated over time, for example upon the exchange of synchronization messages between units of the group. For example, these synchronization messages are sent by each unit 200 at regular intervals, for example with a predefined periodicity.

For example, each synchronization message contains at least one item of information relating to the quality of the radio link with the control device 2, such as an RSSI coefficient, determined from measurements performed in the most recent communication with said control device 2.

Generally, the control device 2 is not necessarily installed in a fixed position and can be moved. For example, the control device 2 is a handheld remote control that can be moved by a user. It is therefore understood that the quality of the radio link can vary if the control device 2 and a new main unit may have to be identified out of the units 200 of the group when the control device 2 changes position.

According to optional but nevertheless advantageous embodiments, conditions can be imposed to be able to construct groups, such as a restriction on the maximum number of units 200 that can be members of one and the same group, and/or on the minimum and maximum numbers of control devices that can be associated with a group, this list being nonlimiting.

These conditions can be predefined by a user or by an administrator of the home automation system, and can be applied to all the home automation system or to at least a part of the units 200.

In the example illustrated, the rules are defined such that each group has to contain at least one control device 2 and comprise at least two units 200.

In FIG. 7, the insert (a) represents a first example of a set 220 of several associated units 200 within a first group G1 with which a control device 2 is associated. In the example illustrated, the units 200 are identical and there are three of them. This example is nonlimiting.

The insert (b) of FIG. 7 represents a second example in which several units 200 and 200' are associated with different groups G1 and G2.

For example, units 200 are associated within a first group G1 similar to that defined previously, and an additional unit 200' is associated with one of the units 200 within a second group G2. Thus, one of the units 200 belongs both to the groups G1 and G2. The first group G1 is associated with a first control device 2, and the second group G2 is associated with a second control device 2' similar to the control device 2.

Such a configuration is advantageous for controlling units 200 and 200' which are distributed in an intersection between two corridors of a building. For example, the first group G1 is associated with a first corridor and the second group G2 is associated with a second corridor.

Figure 8:
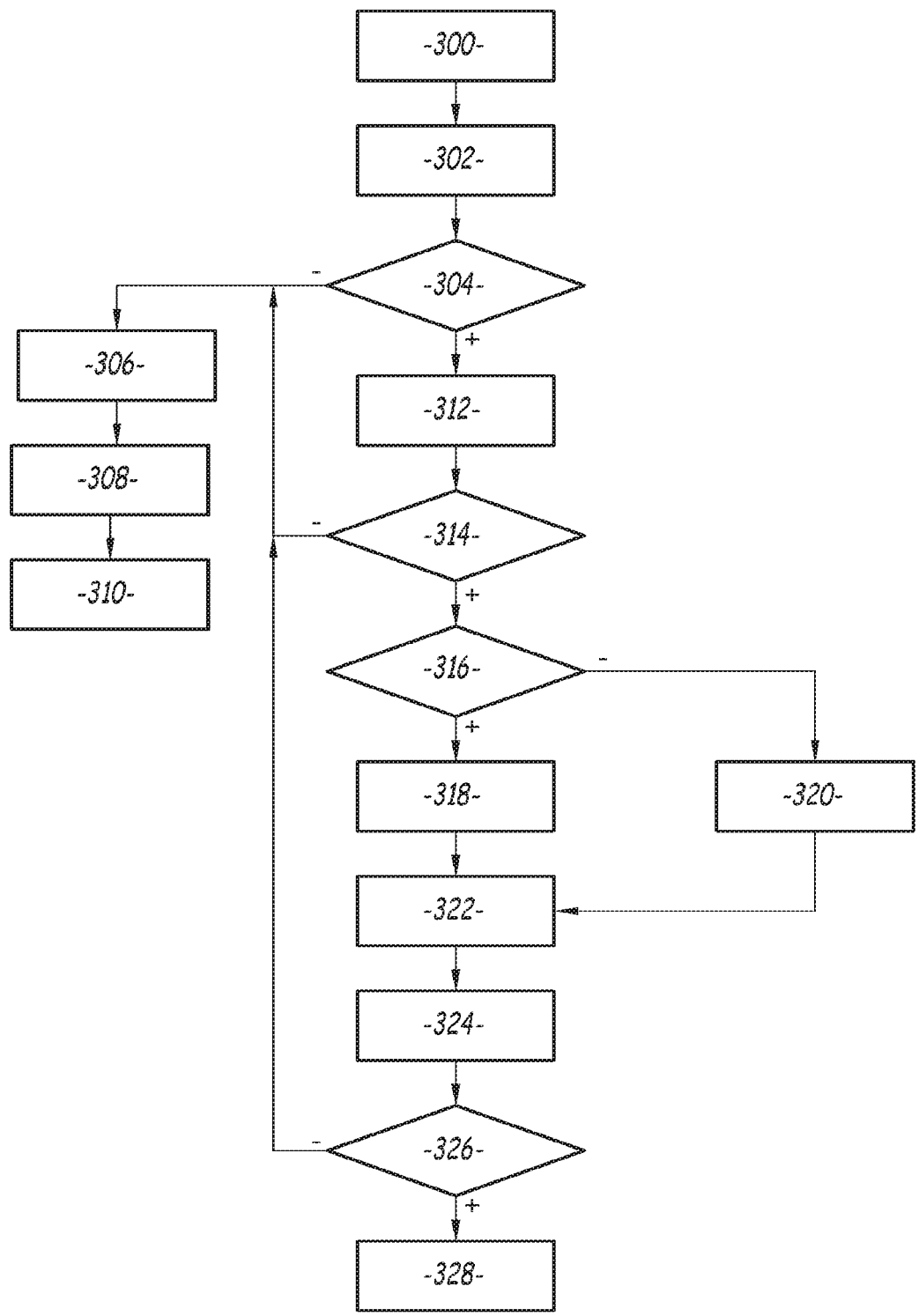
FIG. 8 is a flow diagram of a method for creating a group of electronic units of FIG. 7.

FIG. 8 represents a method for creating a group of units 200.

This method is, here, implemented by each of the units 200 and/of 200' intended to join said group. These units are hereinafter called "selected units".

Hereinbelow, reference is made only to the units 200 but it is understood that the method is also applicable to any units 200' where appropriate.

In a step 300, the selected units 200 are placed in a pairing mode. This pairing mode can be triggered by an action of a user on the interface 212, for example by pressing on the button or on the switch.

Optionally, a first checking step can be implemented at this stage by each unit 200, to check whether other units 200 are already in pairing mode and whether they are not already together in one and the same group. If such is the case, these units 200 then exit from the pairing mode. In the contrary case, these units 200 exit from the pairing mode.

In a step 302, the control device 2 is actuated by a user to send a message to units 200 with which it is in communication via the radio link, such as units 200 with which the control device 2 has previously been paired, and/or units 200 which are situated within the radio range of the control device 2.

Optionally, in a step 304, the unit 200 automatically checks whether the conditions required to create a group are satisfied.

Notably, the unit 200 determines whether a group can be created according to one or more conditions relating to the membership of the unit 200 to one or more already existing groups and/or according to properties of the unit 200 and/or properties of the other units 200 that have to join said group.

According to a first example, the unit 200 automatically checks whether the control device 2 is not already a member of a group to which the unit 200 already belongs. For example, the user may have specified a rule prohibiting one and the same control device from controlling two different groups.

According to a second example, the unit 200 checks whether it is not already a member of at least one group and, if appropriate, whether the number of groups to which it already belongs is less than or equal to a predefined limit. The limit is chosen here to be equal to two.

According to a third example, the unit 200 checks whether it is not paired to a number of control devices 2 greater than or equal to a predefined limit. The limit is chosen here to be equal to ten.

According to a fourth example, the unit 200 checks whether the number of units 200 with which it is in communication and which are placed in the pairing mode is less than or equal to a predefined limit, chosen here to be equal to five, even equal to three.

The examples given above are nonlimiting and can be used alone or according to any admissible combination. The checks can be made in parallel or sequentially, for all or some of the conditions described by way of examples above, or for any combination of these conditions.

If at least one of the conditions is not satisfied, then the group creation process is stopped.

For example, in a step 306, the unit 200 automatically sends a message to the other units 200, this message containing an item of information according to which the group creation has failed.

In a step 308, an error signal is displayed by a user interface of the unit 200, for example by generating a sound or visual alarm, notably using a light indicator situated on the unit 200. This step can be omitted.

The method terminates at the step 310.

If, on the contrary, the conditions are satisfied and the unit 200 determines that a group can be created, then, in a step 312, the unit 200 sends to said other units a message indicating that it has just joined the group. This item of information can be represented by a specific digital value of a field of the message (deny bit).

In a step 314, the unit 200 automatically determines whether one of the other selected units 200 has sent a message indicating an impossibility of joining the group currently being created, for example because this unit has identified that at least one of the conditions was not satisfied when this unit executed the step 304.

If such a message is identified as having been received, then the unit 200 stops the group creation process, for example by implementing the steps 306, 308 and 310.

Otherwise, in a step 316, the unit 200 checks whether it has main unit status.

If yes, in a step 318, the unit 200 automatically defines a group identifier to name the new group. This group identifier is for example generated by the unit 200 from its own identifier. Advantageously, this group identifier is communicated to the other selected units.

If the unit does not have main unit status, then, in a step 320, the unit 200 acquires the name of the group as has been defined by one of the other selected units.

In a step 322, the group is created by the unit 200.

In a step 324, the unit 200 exits the pairing mode.

In a step 326, the unit 200 checks whether all the other selected units of the newly created group have indeed exited the pairing mode.

If such is the case, then the method terminates at the step 328.

Otherwise, the group creation method is stopped, for example by implementing the steps 306, 308 and 310. The newly created group is deleted.

Figure 9:
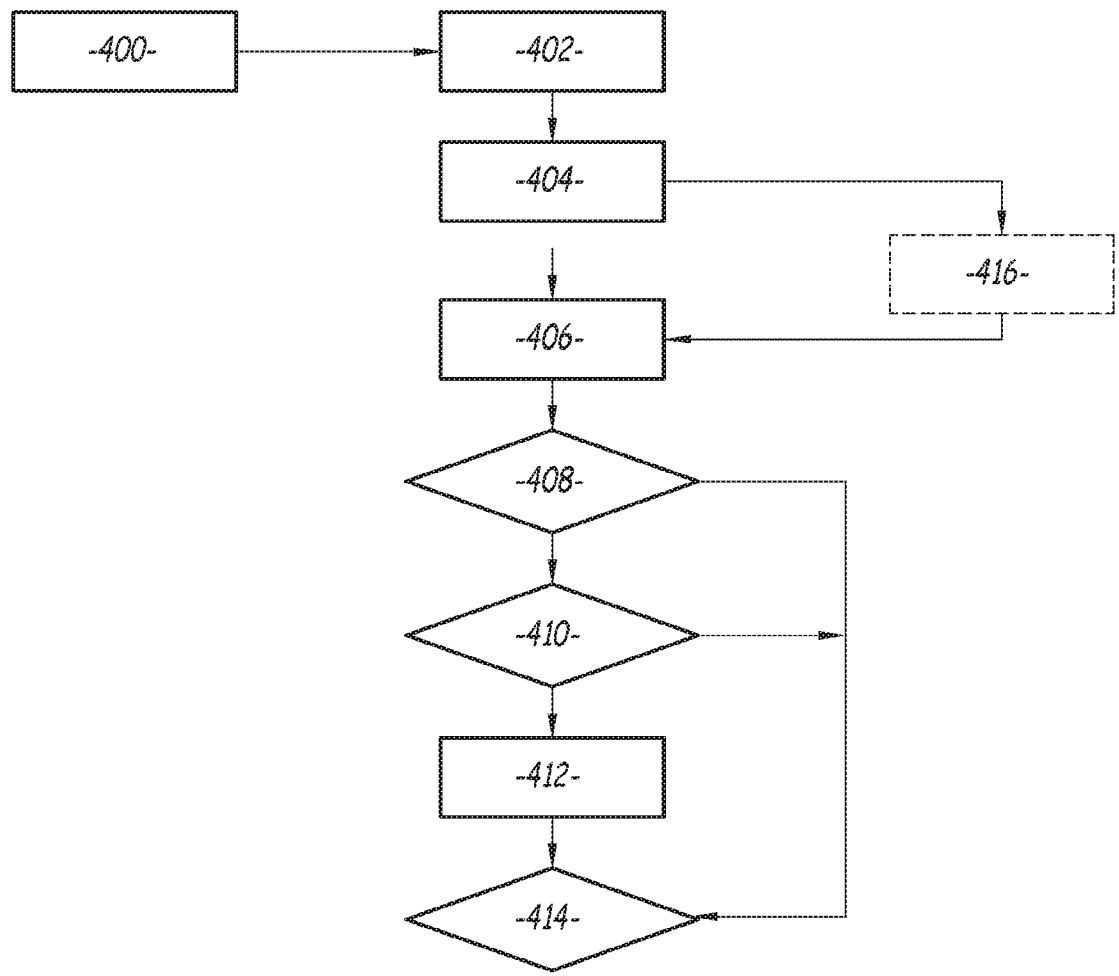
FIG. 9 is a flow diagram of a synchronization method between the electronic units of one and the same group according to embodiments of the invention.

FIG. 9 represents a method of synchronization within a group of units 200.

In a step 400, a control command is sent from a control device 2 to the units 200 of the group, for example in the form of a message comprising one or more radio frames sent over the radio communication link.

In the example considered, the control command can be a command to switch the state of the unit 200 (for example switch the state of the unit 200 from an active state to an inactive state, or vice versa) or a command to change the state of the unit 200.

The message sent is then received by each of the units 200 of the group.

The steps of the method described hereinbelow are implemented by each unit 200, although they are described only with reference to just one of these units 200 in the interests of clarity.

In a step 402, the message is received by the unit 200.

For example, the control command contained in the message is extracted from the message then is stored temporarily in memory 206 of the unit 200. For example, the control command is a digital value.

Optionally, in the step 402, the quality of the radio link is calculated automatically by the unit 200 from one or more characteristics of the received message. For example, the unit 200 automatically calculates an RSSI coefficient.

In a step 404, the unit 200 sends, over the radio communication link, a synchronization message to the other units 200 of the group.

According to embodiments given by way of example, the synchronization message includes information representative of the state of the unit 200 (for example the active or inactive state) after application of the control command, but also of the group identifier, of the control command received and, if appropriate, of the quality of the radio link (RSSI coefficient), even also an identifier of the unit 200, such as a product code.

When the unit 200 belongs to two groups, the synchronization message can include the identifiers of each of said groups, but also information relating to the state of each of the groups, to the control command received and, if appropriate to the quality of the radio link (RSSI coefficient).

Optionally, the sending of the message can be repeated one or more times over time, for example with a predefined periodicity.

In a step 406, the unit 200 receives, over the radio communication link, synchronization messages from the other units belonging to said group.

These synchronization messages preferably have a structure similar to that of the synchronization message sent by the unit 200 and resulting from the implementation of the step 404 by these other units.

In a step 408, the unit 200 automatically determines the state of the main unit from the received messages.

Then, in a step 410, the unit 200 compares the state of the main unit with the value of its own state after application of the control command received in the step 402, that is to say with the state that this unit 200 would take after application of this control command.

In practice, this comparison can be performed after the unit 200 has applied the control command received or else before application of the control command received. In the latter case, the unit 200 extrapolates what its state would be if it were to apply the control command received.

Next, in a step 412, the unit 200 applies the state of the main unit if a disparity is detected between the state of the main unit and the control command received. If no disparity is detected, the unit 200 applies the control command received in the normal way in the step 402.

In other words, according to embodiments, it is detected that at least one of the electronic units 200, 200' of the group has a state different from the state of at least one or more of the other electronic units 200, 200' of the group (and notably of the main unit of the group), then the state of said electronic unit 200, 200' is modified according to the state of a main unit of the group.

In case of failure, the method terminates without necessarily changing the state of the unit 200 (step 414).

Thus, the state of said electronic unit is modified according to the state of a main unit of the group, preferably to harmonize the state of all the units of the group, in order for them to all have the same state, preferably the state imposed by the control command sent by the control device 2.

Optionally, if the unit 200 belongs to several groups each containing a master unit, as in the example illustrated in the insert (b) of FIG. 8, then the unit 200 applies the state of the main unit of one or the other of the groups to which it belongs according to a predefined priority rule.

The method then terminates at the step 414. The unit 200 then awaits reception of a new control command.

If on the other hand, at the end of step 410, all the units are identified as having the same state as the unit 200, then the method terminates in the normal way (step 414) without changing the state of the unit 200.

In parallel with the steps 402 to 414, similar or identical steps are implemented by each of the other units of the group, as illustrated by the block 416 in FIG. 9.

By virtue of the different aspects of the embodiments described above, the units of one and the same group are synchronized and the risk of at least one of them being in an incorrect state is reduced, even in the event of bad reception of the control command, notably by virtue of the fact that the main unit is chosen as being that which benefits from the best link with the control device, and that it is the state of this main unit which is imposed on the other units in case of mismatch.

According to variants, the embodiments described with reference to the management of the groups of units 200 can be implemented independently of the control device 2 and of the pairing method described with reference to FIGS. 1 to 5.

The embodiments and the variants envisaged above can be combined with one another to give rise to new embodiments.

The invention claimed is:

1. A method for operating a wireless control device, said method comprising:
　starting up a control circuit of the control device following the actuation, by a user, of a control unit coupled to an energy harvesting device to recharge an energy reserve which electrically powers the control device;
　sending a control message to an electronic unit, with a radio interface of the control device, the control message including a control command;
　comparing the elapsed time since the starting up of the control circuit with a first threshold value, the energy harvesting device being configured to generate, upon each actuation of the control unit, a quantity of energy that is sufficient to power the control device for a time less than the first threshold value; and
　when the elapsed time is greater than or equal to the first threshold value, based on the energy reserve still being charged in response to the user actuating the control unit more than one time since the starting up of the control unit, sending a pairing request message to the electronic unit, with the radio interface.

2. The method according to claim 1, wherein sending of the control message is repeated as long as the elapsed time is less than the first threshold value.

3. The method according to claim 1, wherein sending of the pair request message is repeated as long as the elapsed time is greater than the first threshold value and less than a second threshold value.

4. The method according to claim 3, wherein the method comprises resuming sending of control messages when the elapsed time is greater than the second threshold value and as long as there remains sufficient energy in the energy reserve.

5. The method according to claim 3, wherein the second threshold value is between 800 ms and 1000 ms.

6. The method according to claim 1, wherein the first threshold value is between 400 ms and 600 ms.

7. The method according to claim 1, wherein the pairing request message includes authentication information specific to the control device, notably a public cryptographic key associated with the control device.

8. The method according to claim 1, wherein the control message comprises a header and a body comprising:
　a unique identifier of the control device;
　the control command;
　security data generated by the control device and aiming to avoid replay attacks;
　a digital signature of the message, generated by the control device.

9. The method according to claim 1, wherein the pairing request message comprises a header and a body comprising:
　a unique identifier of the control device;
　authentication information specific to the control device;
　a digital signature of the message, generated by the control device.

10. The method according to claim 1, wherein the method comprises the stopping of the control circuit when the energy reserve is empty.

11. A method for operating a wireless control device, said method comprising:
　starting up a control circuit of the control device following the actuation, by a user, of a control unit coupled to an energy harvesting device to recharge an energy reserve which electrically powers the control device;
　sending a control message to an electronic unit, with a radio interface of the control device, the control message including a control command;
　comparing the elapsed time since the starting up of the control circuit with a first threshold value, the energy harvesting device being configured to generate, upon each actuation of the control unit, a quantity of energy that is sufficient to power the control device for a time less than the first threshold value;
　when the elapsed time is greater than or equal to the first threshold value, sending a pairing request message to the electronic unit, with the radio interface;
　receiving, by a plurality of electronic units belonging to one and the same group of units, the control message sent by the control device;
　sending, by each electronic unit, a synchronization message to the other electronic units of the group, the synchronization message comprising information representative of a state of the electronic unit and of a control command contained in said control message;
　detecting that at least one of the electronic units of the group has a state different from the state of at least one or more of the other electronic units of the group; and
　modifying the state of said electronic unit according to the state of a main unit of the group.

12. The method according to claim 11, wherein the main unit is the electronic unit of the group for which the quality of the radio communication link with the control device is the highest out of the electronic units of the group.

13. A pairing method between a wireless control device and an electronic unit, wherein said method comprises:
　activating a pairing mode of the electronic unit;
　implementing, by the wireless control device, a method according to claim 1;
　by the electronic unit being configured for:
　　detecting the reception of a pairing request message sent by said control device;
　　determining whether said control device is already paired with the electronic unit;
　　accepting the pairing of the control device if the latter was not already paired with the electronic unit or, otherwise, cancelling the pairing of the control device.

14. A wireless control device, comprising:
　a control unit that can be actuated by a user;
　an energy harvesting device coupled to the control unit;
　an energy reserve recharged by the energy harvesting device and which electrically powers the control device;
　a control circuit and a radio interface;

the control circuit being programmed to:
- start up, following the actuation, by a user, of the control unit;
- send a control message to an electronic unit, with the radio interface, the control message including a control command;
- compare the elapsed time since the starting up of the control circuit with a first threshold value, the energy harvesting device being configured to generate, upon each actuation of the control unit, a quantity of energy that is sufficient to power the control device for a time less than the first threshold value; and
- when the elapsed time is greater than or equal to the first threshold value, based on the energy reserve still being charged in response to the user actuating the control unit more than one time since the starting up of the control unit, the control circuit is programmed to send a pairing request message to the electronic unit, with the radio interface.

15. A home automation system comprising a control device according to claim 14 and a plurality of electronic units, wherein the electronic units are configured to implement steps comprising:
- receiving, by a plurality of electronic units belonging to one and the same group of units, the control message sent by the control device;
- sending, by each electronic unit, a synchronization message to the other electronic units of the group, the synchronization message comprising information representative of a state of the electronic unit and of a control command contained in said control message;
- detecting that at least one of the electronic units of the group has a state different from the state of at least one or more of the other electronic units of the group;
- modifying the state of said electronic unit according to the state of a main unit of the group.

* * * * *